United States Patent [19]
Ellis et al.

[11] Patent Number: 5,739,648
[45] Date of Patent: Apr. 14, 1998

[54] MOTOR CONTROLLER FOR APPLICATION IN A MOTOR CONTROLLER NETWORK

[75] Inventors: George Henry Ellis; Gregory Robert Lee, both of Blacksburg, Va.

[73] Assignee: Kollmorgen Corporation, Waltham, Mass.

[21] Appl. No.: 694,366

[22] Filed: Aug. 8, 1996

Related U.S. Application Data

[60] Provisional application No. 60/003,747, Sep. 14, 1995.
[51] Int. Cl.[6] ......................................... H02P 1/54
[52] U.S. Cl. .................. 318/112; 318/103; 388/907.5
[58] Field of Search ........................ 318/101, 102, 318/103, 105, 111, 112, 113; 388/907.5

[56] References Cited

U.S. PATENT DOCUMENTS 4,289,997  9/1981  Jung et al. ........................ 318/113
4,774,441  9/1988  Toyomasu et al. ................. 318/102
5,179,421  1/1993  Parker et al. .
5,534,758  7/1996  Yamamoto et al. ................. 318/112

Primary Examiner—Bentsu Ro
Attorney, Agent, or Firm—Morgan & Finnegan

[57] ABSTRACT

A motor controller that incorporates all of the advantages of RS-485, yet allows the user to interface with the controller through RS-232 without a separate RS-232 to RS-485 converter. The controller includes a port for receiving RS-232 compatible signals. The RS-232 signals are converted to RS-485 compatible signals which are, in turn, converted into logic level signals suitable for the motor controller. The RS-485 signals may be shared among a number of controllers, and an RS-485 port is provided for such a purpose. RS-485 ports can be interconnected via a common bus so that a number of motors can be separately controlled from a master controller (usually a personal computer) that is connected to any available RS-232 port.

8 Claims, 3 Drawing Sheets

MOTOR CONTROLLER FOR APPLICATION IN A MOTOR CONTROLLER NETWORK

CROSS REFERENCE TO RELATED APPLICATION

This application is a nonprovisional application based on pending U.S. provisional application No. 60/003,747 filed on Sep. 14, 1995.

FIELD OF INVENTION

This invention relates to motor controllers, and more particularly to the networking of motor controllers through standard interfaces.

BACKGROUND OF THE INVENTION

Two well known electronic interface standards are Recommended Standard 232 (RS-232) and Recommended Standard 485 (RS-485). These standards were developed by the Electrical Industries Association (EIA) and they define the mechanical and electrical characteristics for interconnecting data communications devices, such as computers, terminals and modems. These standards have been applied in the motor controller industry to control one or more motors from a master controller.

RS-232 is the more commonly used standard. It is supported by most personal computers (PCs) and is frequently used with motor controllers and other industrial equipment. However, RS-232 possesses two key limitations. The first limitation is that a single RS-232 interface bus can support communication between no more than two devices. Thus, for example, an RS-232 port on a computer may be used to supply commands to a single motor controller, but is not capable of supplying commands to two or more controllers. To command two motor controllers through RS-232 interfaces, one would need a computer having two RS-232 ports and two communication channels, or alternatively, two interconnected computers, each having an RS-232 port, and two separate communication channels. Accordingly, RS-232 is not well suited for use with multiple controllers.

The second limitation of the RS-232 interface concerns its noise immunity. In RS-232 the receive and transmit signals are referenced to common, and thus a typical interface includes three connections which are Receive, Transmit and Common. This type of signaling, often referred to as "single-ended" signaling, is susceptible to noise because the receive and transmit signals both have the same common reference.

To eliminate some of these problems, RS-485 was conceived. RS-485 may be used to connect many devices (up to 32) together via a shared bus. For example, a computer having a single RS-485 port may be coupled to a communications bus that is, in turn, coupled to as many as 31 motor controllers each having an RS-485 interface.

Moreover, RS-485 uses "double-ended" signaling which is less susceptible to noise than single-ended signaling. In double-ended signaling, the receive and transmit paths are each allocated a pair of lines. The signal value is the potential difference between the pair of lines allocated for that signal. Accordingly, a typical RS-485 interface includes 5 connections, Receive+, Receive-, Transmit+, Transmit- and Common. This type of signaling, also called "differential signaling", is less sensitive to noise because the Common is not a signal carrier. For example, a Receive signal value of 10v may be represented as a value of 12v on the Receive+ line and 2v on the Receive- line. If a 1v noise signal is incident on both lines, the Receive+ line will be at 13v and the Receive- line will be at 3v, but the value of the Receive signal will still be 10v. This property of RS-485 gives it noise immunity characteristics superior to those of RS-232.

Motor controllers usually come equipped with an RS-232 interface or an RS-485 interface, or both. In cases where both RS-232 and RS-485 are present, only one or the other can be used. Motor controllers having RS-485 interfaces may be coupled to a shared bus and commanded by a computer that is also coupled to the bus. RS-485 interfaces are seldom found in personal computers and RS-232 interfaces commonly found in personal computers are not suitable for multiple controller configurations. Furthermore, controllers having RS-485 interfaces benefit from RS-485's superior noise immunity, an important consideration in view of the relatively high levels of noise generated by electric motors. However, despite the advantages of RS-485, most computers are equipped solely with RS-232 interfaces, and therefore in order to make use of a motor controller having an RS-485 interface a user must often purchase a separate RS-232 to RS-485 converter. Such converters, like many stand-alone electronic components, require their own housings, their own circuit boards and their own power circuitry, and become relatively expensive.

SUMMARY OF THE INVENTION

A motor controller according to the present invention incorporates all of the advantages of RS-485, yet allows the user to interface with the controller through RS-232 without a separate RS-232 to RS-485 converter.

A controller according to the present invention includes a port for receiving RS-232 compatible signals. The RS-232 signals are converted to RS-485 compatible signals which are, in turn, converted into logic level signals suitable for the motor controller. The RS-485 signals may be shared among a number of controllers, and an RS 485 port is provided for such a purpose. RS-485 ports can be interconnected via a common bus so that a number of motors can be separately controlled from a master controller (usually a personal computer) connected to any available RS-232 port. Each motor controller interprets command information that is received from the master controller via the RS-485 bus and accepts data that is addressed to it. By including an RS-232 port and an RS-485 port in each of the motor controllers, and by converting RS-232 signals to RS-485 signals which, in turn, are converted to logic level control signals for the motor controller, any desired multi-controller configuration can be created without any need for a stand-alone converter with its attendant housing, circuit boards, and power circuitry.

In a motor controller network according to the present invention, several controllers of the above-described type can be linked together through their RS-485 ports. The master controller may be coupled to the network through any one of the available RS-232 ports.

DETAILED DESCRIPTION

Figure 1:
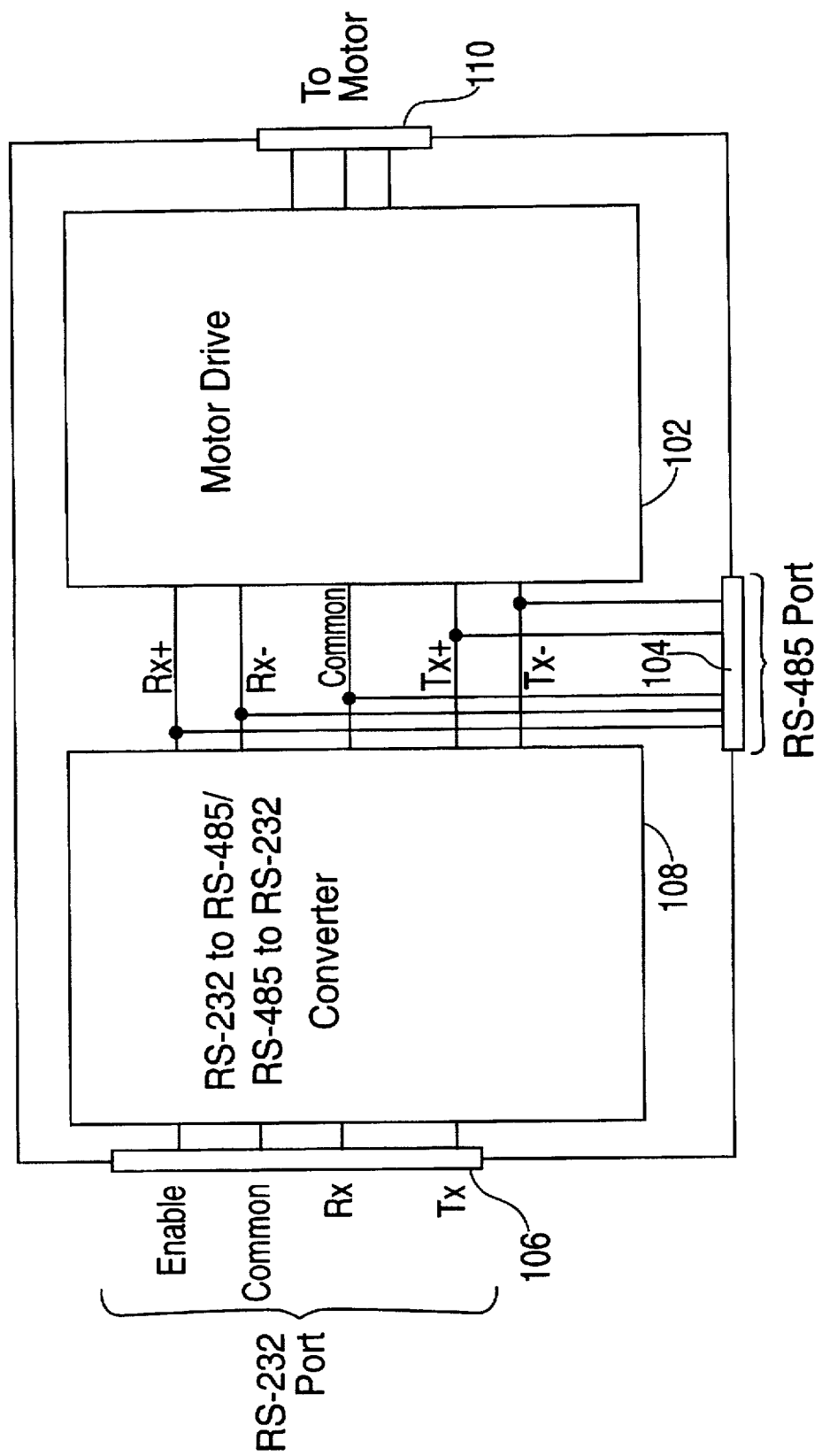
FIG. 1 is a block diagram of a motor controller in accordance with the invention.

FIG. 1 illustrates a motor controller according to the present invention. The motor controller includes a motor drive unit 102 which generates motor drive signals at connector 110 in response to RS-485 command signals. These command signals may be received either through an RS-485 port 104, in which case they are directly coupled to the drive unit, or through an RS-232 port 106, in which case are converted to RS-485 prior to reception by the drive unit. Similarly, signals from the motor drive unit, such as feedback signals indicative of the motor state, may be passed to the RS-232 port or to the RS-485 port. In order to convert signals for passage through the RS-232 port, the controller includes an RS-232 to RS-485 and RS-485 to RS-232 converter 108 (RS-232/485 converter).

Figure 2:
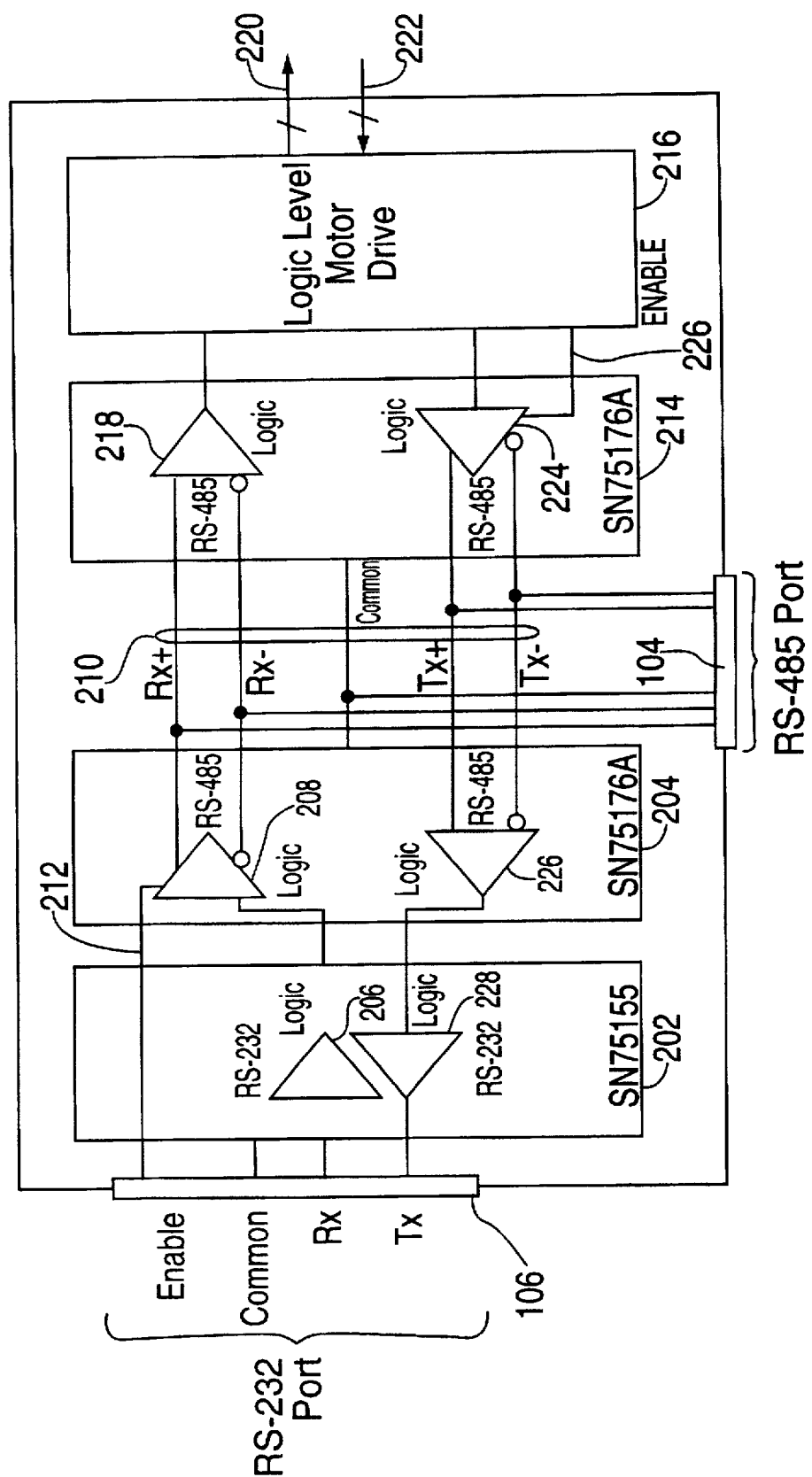
FIG. 2 is a schematic diagram of a preferred embodiment of the motor controller shown in FIG. 1.

FIG. 2, is a schematic diagram illustrating circuit details of a preferred embodiment of the motor controller. In the FIG. 2 embodiment, the RS-232/485 converter is made up of two integrated circuits. One of the integrated circuits is an RS-232 to Logic and Logic to RS-232 converter 202, such as the Texas Instruments SN75155 Line Driver and Receiver. The other integrated circuit is a Logic to RS-485 and RS-485 to Logic converter 204, such as the Texas instruments SN75176A Differential Bus Transceiver. The RS-232 converter 202 accepts signals through port 106 and converts them to logic level signals through a drive amplifier 206. The logic level signals generated are, in turn, passed through amplifier 208 of converter 204, where they are converted to RS-485 signals. The conversion from logic level to RS-485 generally involves differential amplification of the logic level signal, as shown by the inclusion of differential amplifier 208.

Once the RS-232 signals have been converted to RS-485 they may be coupled to an RS-485 bus 210. The coupling of the signals to the bus is controlled through an enable signal 212 that is received through port 106. The enable signal may be an RS-232 signal that passes through converter 202 to converter 204 (shown in FIG. 2), or alternatively, may bypass converter 202 and pass directly from port 106 to converter 204 (not shown). When amplifier 208 is enabled, the signals from converter 204 are coupled to the RS-485 bus.

In the FIG. 2 embodiment, the motor drive unit includes an RS-485 converter 214 and a logic level motor drive 216. Converter 214 receives RS-485 signals from converter 204 or bus 210 and translates these signals into logic level signals for controlling the motor drive 216. The conversion from RS-485 to logic level is accomplished by amplifier 218. Converter 214 is functionally the same as converter 204 and thus may likewise be a Texas Instruments SN75176A Differential Bus Transceiver.

Based on the logic level signals received from converter 214, the logic level motor drive generates signals 220 for energizing the motor. There are many possible embodiments for the motor drive. One common embodiment includes a microprocessor, a pulse width modulated (PWM) amplifier and a transistor power output stage. In such an embodiment the microprocessor can regulate the amplifier output based on the signals that the microprocessor receives from converter 214.

In addition to generating motor drive signals, the controller may feedback signals 222 from the motor back to ports 104 and 106. The feedback signals are logic level signals that are passed back through converter 214 and converted to RS-485 signals by a differential amplifier 224. The converted signals appear on the RS-485 bus 210. The coupling of the signals to the bus is controllable by an enable signal 226. Converter 204 translates the signals from RS-485 to logic level using amplifier such as amplifier 226. Converter 202 then converts the signals from logic level to RS-232 using amplifier 228.

Thus, the "single ended" RS-232 signals at port 106 are converted to "double ended" RS-485 signals appearing at port 104. The double ended signals, in turn, are converted to logic level signals for the motor drive 216. Multiple motor controllers can be interconnected via ports 104.

Figure 3:
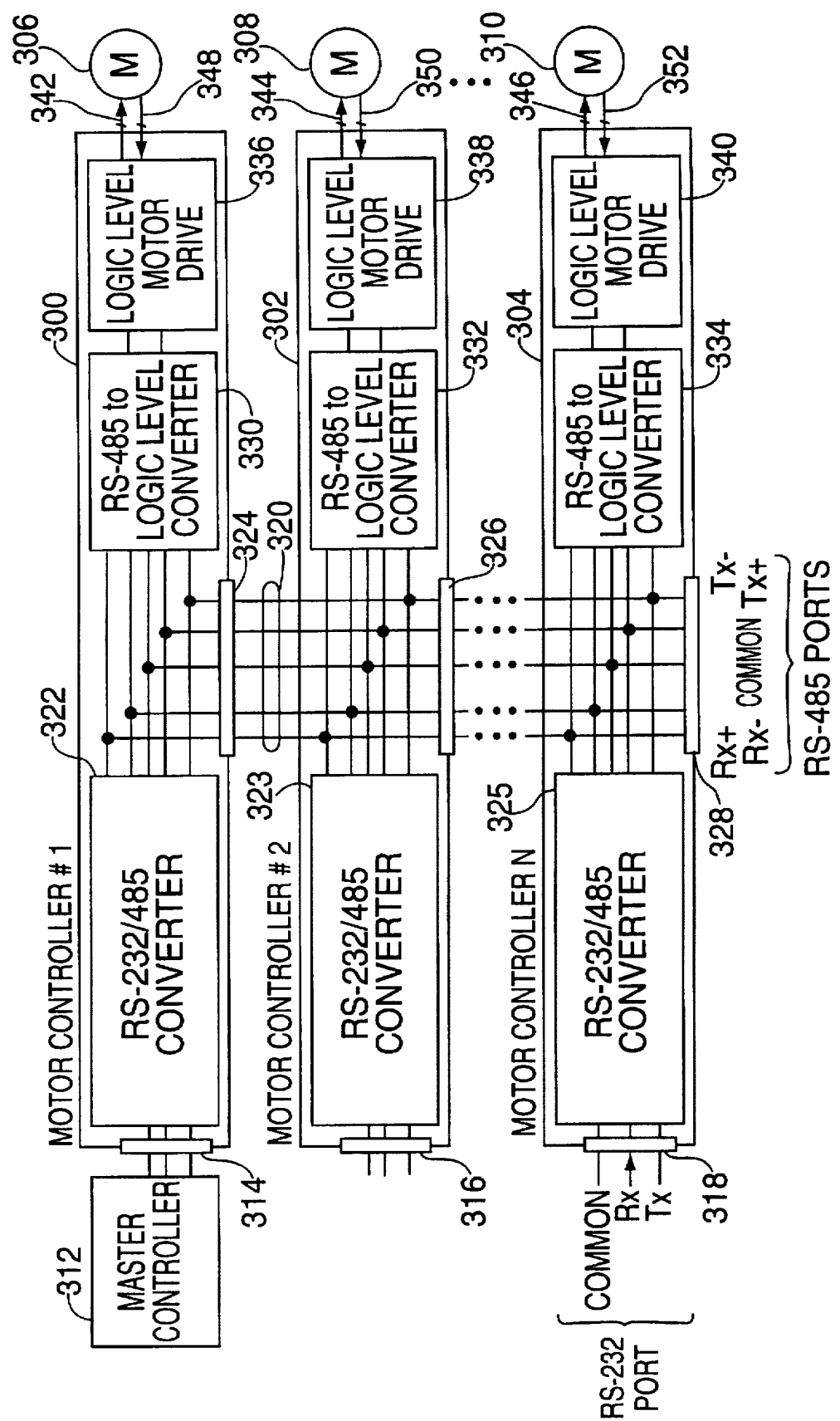
FIG. 3 is a schematic diagram of a network of interconnected controllers in accordance with the invention.

A number of motor controllers of the above-described type can be linked together to form a network of controllers as shown in FIG. 3. Motor controllers 300, 302 and 304 are used to control motors 306, 308 and 310, respectively. In keeping with the RS-485 standard, the network may include up to 32 units. A single master controller 312 may be used to command all of the motor controllers in the network. This master controller may be a personal computer, a laptop computer, or other type of computer terminal. Such computers generally come equipped with an RS-232 port and can be connected to the network through any of the available RS-232 ports 314, 316 and 318. The master controller 312 is shown coupled to port 314 of controller 300. Through port 314 the master controller may issue commands that are passed to all of the controllers via an RS-485 bus 320.

For purposes of illustration, assume a master controller used to control 3 motors, one for each of 3 axes of motion. Further, assume that the master controller issues a rotational position command for each motor. The issued commands each identify a specific motor controller destined to carry out the command. These commands issued by master controller 312 pass through port 314 as a single stream of RS-232 data. The data stream is converted to RS-485 signals by converter 322 and passed to the RS-485 bus 320. (Converters 323 is used when the master controller is coupled to port 316, and converter 325 is used when the master controller is coupled to port 318.)

Once on the RS-485 bus 320, the data is passed to the other controllers through RS-485 ports 324, 326 and 328. Each controller is equipped with an RS-485 to Logic Level and Logic Level to RS-485 converter (converters 330, 332 and 334) which receives the RS-485 data stream and converts it to a logic level signal. Each logic level signal is then relayed to an associated logic level motor drive (drives 336, 338 and 340).

Each logic level motor drive must analyze the data stream to identify portions of the data stream that are intended for that drive. This could be done by including identification tags within the data stream at the time of origination. For example, the digital equivalent of "\A" may be used as an indication of data intended for motor 306, "\B" may be used to indicate data intended for motor 308, and "\C" may be used to indicate data intended for motor 310. Thus, when the data signal arrives at motor drive 336 and the drive detects a "\A", the drive knows that the immediately following data is intended for it. Drive 336 then accepts data until it detects a "\B" or "\C", indicating the end of the data intended for it. Each logic level drive uses the logic level signals intended for it to energize the associated motor.

Also illustrated in FIG. 3 are motor feedback signals 348, 350 and 352. These are signals which are passed back to the logic level drives by motors 306, 308 and 310, respectively. Typically, the feedback signals include motor status information, such as velocity and position which may be useful for the motor controller. The logic level signals from the motor drives are converted to RS-485 on bus 320 and, in turn, are converted to RS-232 via converter 322. The master controller must analyze each feedback signal to determine the motor from which it originated. To this end, a method similar to that used for distinguishing command signals may be invoked. Each feedback signal may be tagged by the logic level drive that receives it. Thereafter, when a feedback signal reaches the master controller the signal's tag may be used to determine from which motor the signal originated. Once the feedback signals have been identified, they may be used for purposes such as displaying the status of the motor to an operator, and/or formulating motor commands.

While the best mode for carrying out the invention has been described in detail, those familiar with the art to which the invention relates will recognize various alternative designs and embodiments for practicing the invention as defined by the following claims.

I claim:

1. A motor control network for separately controlling a plurality of electric motors through a plurality of motor controllers from a common master controller, comprising:
   (1) a plurality of motor controllers each including
      (a) an RS-232 port;
      (b) an RS-485 port; and
      (c) a logic level motor drive for energizing an associated electric motor according to logic level commands;
      wherein
         (i) each said RS-232 port is coupled to said RS-485 port via a converter; and
         (ii) each said RS-485 port is coupled to said logic level motor drive via a converter to supply said logic level commands from signals at said RS-485 port;
   (2) a master controller coupled to one of said RS-232 ports; and
   (3) said motor controllers being interconnected via said RS-485 ports for control from said master controller.

2. A motor controller network according to claim 1, wherein said motor controllers are interconnected via a common RS-485 bus and commands from said master controller are selectively addressed to particular motor controllers.

3. A motor controller adapted for control of an electric motor from a master RS-232 source, comprising:
   (a) an RS-232 port;
   (b) an RS-485 port;
   (c) said RS-232 port being coupled to said RS-485 port via a converter used for converting RS-232 signals to RS-485 signals;
   (d) a logic level motor drive for generating motor drive signals according to logic level commands; and
   (e) said RS-485 port being coupled to said logic level motor drive via a converter to supply said logic level commands.

4. A motor control network including:
   a plurality of motor controllers each adapted for control of an electric motor from a master RS-232 source, and including
      (a) an RS-232 port;
      (b) an RS-485 port;
      (c) said RS-232 port being coupled to said RS-485 port via a converter used for converting RS-232 signals to RS-485 signals;
      (d) a logic level motor drive for generating motor drive signals according to logic level commands;
      (e) said RS-485 port being coupled to said logic level motor drive via a converter to supply said logic level commands; and
      (f) a master controller connected to one of said RS-232 ports; and
   wherein said plurality of motor controllers are interconnected through said RS-485 ports.

5. A motor control network for separately controlling a plurality of electric motors through a plurality of motor controllers from a common master controller, comprising:
   (1) a plurality of motor controllers each including
      (a) a first port that supports single ended signaling;
      (b) a second port that supports double ended signaling; and
      (c) a logic level motor drive for energizing an associated electric motor according to logic level commands;
      wherein
         (i) each said first port is coupled to said second port via a converter; and
         (ii) each said second port is coupled to said logic level motor drive via a converter to supply said logic level commands from signals at said second port;
   (2) a master controller coupled to one of said first ports; and
   (3) said motor controllers being interconnected via said second ports for control from said master controller.

6. A motor controller network according to claim 5, wherein said motor controllers are interconnected via a common double ended signaling bus and commands from said master controller are selectively addressed to particular motor controllers.

7. A motor controller adapted for control of an electric motor from a master single ended signaling source, comprising:
   (a) a first port that supports single ended signaling;
   (b) a second port that supports double ended signaling;
   (c) said first port being coupled to said second port via a converter used for converting single ended signals to double ended signals;
   (d) a logic level motor drive for generating motor drive signals according to logic level commands; and
   (e) said second port being coupled to said logic level motor drive via a converter to supply said logic level commands.

8. A motor control network including
   a plurality of motor controllers each adapted for control of an electric motor from a master single ended signaling source and including:
      (a) a first port that supports single ended signaling;
      (b) a second port that supports double ended signaling;
      (c) said first port being coupled to said second port via a converter used for converting single ended signals to double ended signals;
      (d) a logic level motor drive for generating motor drive signals according to logic level commands;
      (e) said second port being coupled to said logic level motor drive via a converter to supply said logic level commands; and
      (f) a master controller connected to one of said first ports; and
   wherein said plurality of motor controllers are interconnected through said second ports.

* * * * *